UNITED STATES PATENT OFFICE.

LAZARE WEILLER, OF ANGOULÊME, CHARENTE, FRANCE.

MANUFACTURE OF SILICIOUS COPPER AND BRONZE FOR MAKING ELECTRIC CONDUCTORS.

SPECIFICATION forming part of Letters Patent No. 277,089, dated May 8, 1883.

Application filed October 9, 1882. (No specimens.) Patented in France December 14, 1881, and April 15, 1882, No. 148,457; in Belgium January 17, 1882, No. 56,795, and in England April 17, 1882, No. 1,821.

*To all whom it may concern:*

Be it known that I, LAZARE WEILLER, of Angoulême, Charente, in the Republic of France, have invented certain new and useful Improvements in the Manufacture of Silicious Copper and Bronze for Making Electric Conductors, and for other purposes, which improvements are fully set forth in the following specification.

This invention has for its object to produce compounds of copper or bronze and silicium in an industrial way and less expensively than heretofore, and to make of said compounds electrical conductors. The addition of silicium to copper has been proposed by Sté. Claire Deville; but the processes indicated by this chemist require the preliminary preparation of a pure silicium, and also the use of sodium to prevent oxidation. By the present invention the labor and expense involved in the preparation of these substances are avoided.

The invention consists in introducing into the melted copper or bronze materials which by their reactions are adapted to furnish the silicium and sodium for making the desired alloys or silicious compounds of copper and bronze.

It further consists in making electrical conductors of the silicious copper and bronze.

The following description will enable those skilled in the art to which the invention relates or to which it most nearly appertains to make and use the same.

In a plumbago-crucible is placed a mixture of potassium fluosilicate, four hundred and fifty grams; crushed or pulverized glass, six hundred grams; sodium chloride, (common salt,) two hundred and fifty grams; sodium carbonate, seventy-five grams; calcium carbonate, sixty grams; calcium chloride, (dry,) five hundred and sixty grams. This mixture is brought to a temperature approximating but below that at which chemical reaction of the different bodies takes place, and is then thrown into the bath of molten copper or bronze. By reason of the higher temperature of the bath, reaction takes place at once, and the silicium and sodium set free combine directly with the metal.

It has heretofore been known that silicium is obtained by acting upon potassium fluosilicate with an energetic deoxidant, such as sodium. Deville has proposed to substitute for the potassium fluosilicate a mixture of sand and common salt.

In proceeding as just described, the two methods are combined, potassium fluosilicate, crushed glass, and sodium chloride being employed together. It would be impracticable to employ metallic sodium on account of its great cost. By using materials capable of producing it—such as the sodium carbonate, calcium carbonate, and carbon—in the mixture described, not only is the heavy expense avoided, but the advantage of setting free the sodium in the very body of the mass is obtained. Besides the sodium, calcium (which has a similar action) is produced or set free in the metal. The calcium chloride in presence of potassium fluosilicate is transformed into calcium fluoride, and this compound is decomposed in presence of the carbon and carbonates, leaving the metal in a free state. The calcium chloride in the mixture also serves to absorb the scoria or cinders during the formation of the same.

For the quantities of the several materials mentioned in the above mixture the quantity of metal is or may be for copper alone ten kilograms, and for bronze ten kilograms of copper with four hundred and sixty grams of tin. When the reactions are complete the metal is run into bars, which are drawn through special dies of diamond into wires of say two millimeters in diameter.

The electric conductibility of the silicious metals or alloys is sixty-one per cent. and upward of that of copper and four or more times that of iron. With equal conducting-power the weight of the wire is about four times less than iron wire and five times less than steel wire.

The presence of the silicium gives to the copper and to bronze a resistance to rupture equal to that of steel. By reason of these qualities silicious copper and bronze are particularly well adapted to the manufacture of wires or conductors for telegraphic, telephonic, and other electrical purposes. The silicious bronze is preferred. The telegraphic wires being small in weight and diameter, they exert much less strain on the poles, and their use is very economical for this reason.

Within certain limits the proportions of the materials entering into the silicious metal or alloy can be varied.

It may be observed that copper has been fused under fluor-spar or a mixture of fluor-spar and glass; also under a mixture of borax and glass, soda and glass, soda alone, soda and common salt, or common salt alone; also, that it has been proposed to add to molten copper a mixture of clay, alkali, borate of soda, straw or sawdust, and glass in about equal parts for the purpose of refining the copper. These processes, however, are essentially different from my invention, and do not result in the production of the material which it is the object of the invention to make.

Having now fully described my said invention and the manner of carrying the same into effect, what I claim is—

1. The method of preparing silicious copper and bronze by adding to the molten copper or bronze a mixture containing substances, substantially as specified, adapted by the reactions to furnish the silicium and sodium necessary to the formation of the silicious compounds, substantially as described.

2. The method of making electric conductors by adding to molten copper or bronze materials, such as specified, for converting it into silicious copper or bronze, casting the metal or alloy into bars, and wire-drawing the same, substantially as described.

In witness whereof I have hereunto signed my name in the presence of two subscribing witnesses.

L. WEILLER.

Witnesses:
J. LARVEH TOUKUTZ,
GREGORY PHELAN.